United States Patent [19]
Close

[11] 3,907,688
[45] Sept. 23, 1975

[54] VALVE FOR A FILTER

[75] Inventor: Sam Close, Lebanon, Ind.

[73] Assignee: The Carborundum Company, Niagara Falls, N.Y.

[22] Filed: Aug. 3, 1973

[21] Appl. No.: 385,390

Related U.S. Application Data

[63] Continuation of Ser. No. 131,304, April 5, 1971, abandoned.

[52] U.S. Cl. ........... 210/424; 137/625.47; 210/278; 210/444
[51] Int. Cl............................................. B01d 27/10
[58] Field of Search.... 210/190, 278, 418, 420–425, 210/444; 137/625.17, 625.19, 625.21, 625.22, 625.47, 595; 251/311

[56] References Cited
UNITED STATES PATENTS

| | | | |
|---|---|---|---|
| 1,590,128 | 6/1926 | Staples | 210/424 X |
| 1,750,879 | 3/1930 | Markus et al. | 210/278 X |
| 2,845,948 | 8/1958 | Parker | 137/625.17 |
| 3,283,354 | 11/1966 | Simmons | 137/625.47 X |
| 3,616,820 | 11/1971 | Fleckenstein | 210/278 |

FOREIGN PATENTS OR APPLICATIONS

798,662   11/1968   Canada

*Primary Examiner*—John Adee
*Attorney, Agent, or Firm*—David E. Dougherty; Robert C. Weber

[57] ABSTRACT

In a valve for a filter, a valve body includes an opening and a pair of conduits communicating therewith. A gate which is rotatably mounted within the opening is provided with a by-pass passage for the flow of fluid between the conduits when the gate is in a by-pass position and an inner chamber and an outer chamber for the flow of fluid through a filter chamber when the gate is in a filtering position.

2 Claims, 5 Drawing Figures

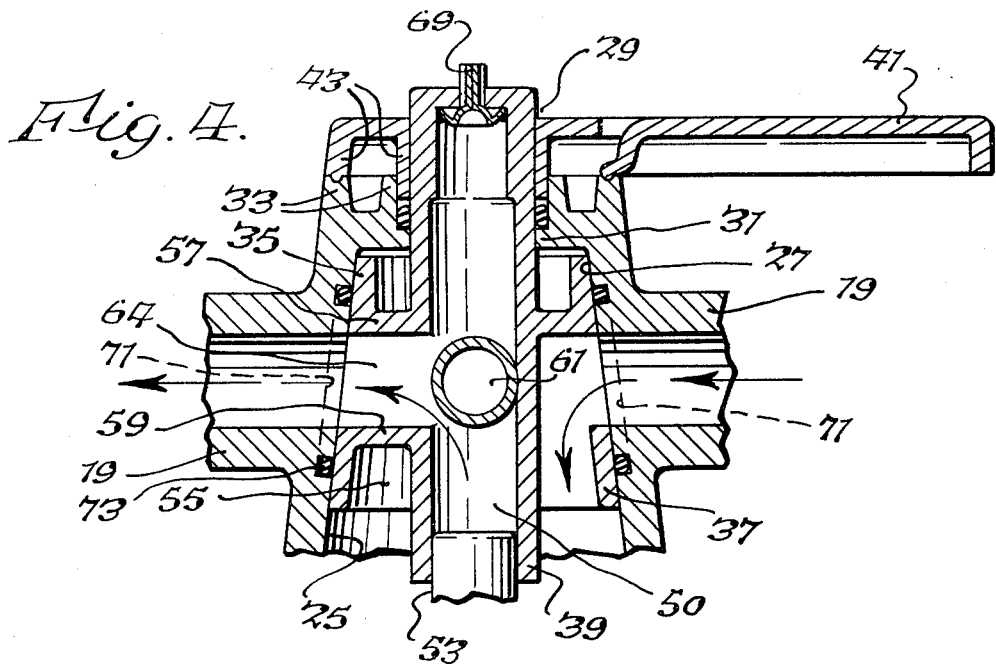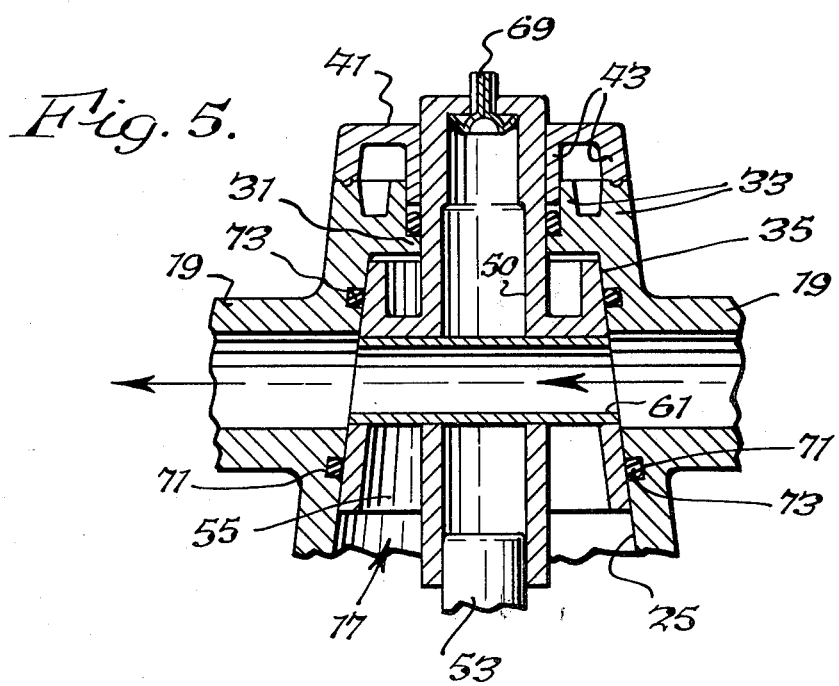

VALVE FOR A FILTER

This is a continuation of copending application Ser. No. 131,304, filed Apr. 5, 1971, now abandoned.

BACKGROUND OF THE INVENTION

Valves used in filtering apparatus for controlling and directing fluid flow are often complex in design and difficult to adjust. Often the pressure drop across valves in the prior art is high or their construction creates a high risk of leakage. Moreover, such valves are usually external to the filter head and require separate lines to and from a filter head.

SUMMARY OF THE INVENTION

In a valve for a filtering apparatus, a valve body has an opening and a pair of laterally extending conduits that communicate therewith. A gate which is mounted within the opening rotates between a by-pass position and a filter position. A passage within the gate directs the flow of fluid between the conduits when the gate is in a by-pass position. The gate includes an inner cylindrical wall forming an inner chamber communicating with one conduit and an outer wall forming an outer chamber communicating with the other conduit when the gate is in a filter position.

The valve of the present invention which is integral with the filter head is easy to operate and effective in changing fluid flow from filtering to by-passing the filter without leakage or a high pressure drop. Moreover, the valve may be closed at an intermediate position.

BRIEF DESCRIPTION OF THE DRAWINGS

The drawings which illustrate a preferred embodiment of the present invention are as follows:

FIG. 4 is a partial sectional view along line 4—4 of FIG. 2 showing the valve in a filtering position; and FIG. 5 is a partial sectional view along line 5—5 of FIG. 3.

DETAILED DESCRIPTION OF A PREFERRED EMBODIMENT

Figure 1:
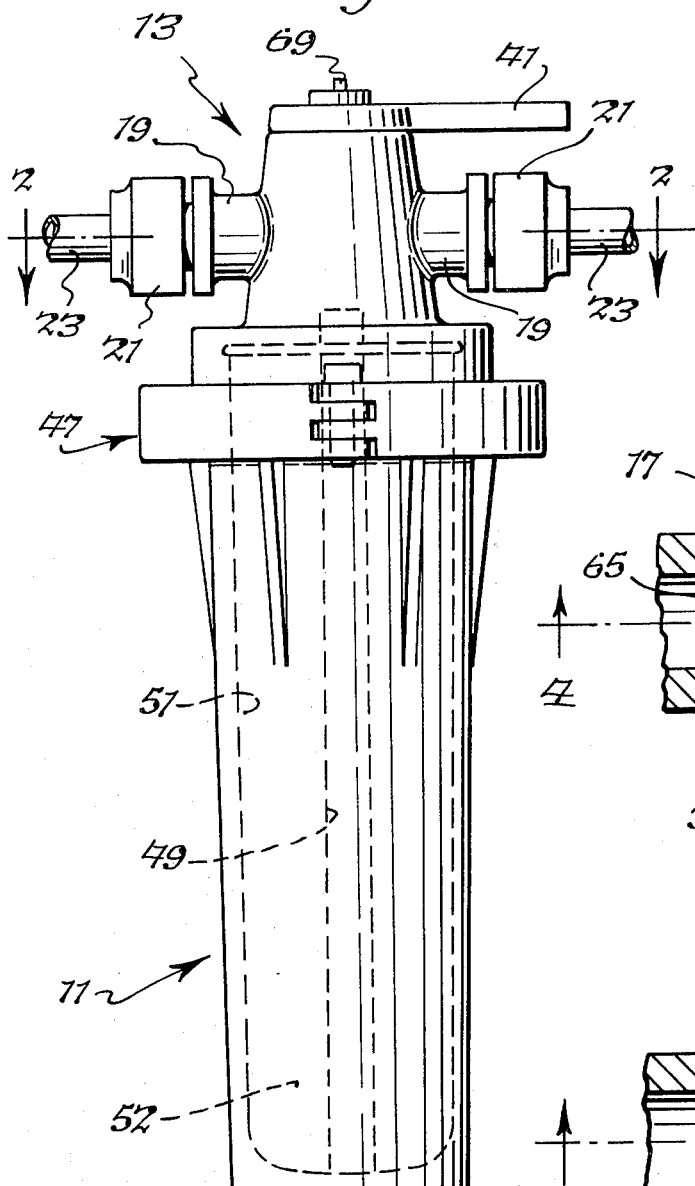
FIG. 1 is a side elevational view of a valve and filter subassembly.

Referring to FIG. 1, a filter assembly generally indicated at 11 is attached to the valve or filter head 13. The valve 13 includes a valve body or housing 15 having an opening 17 therein with laterally extending conduits 19 communicating with the opening 17. One conduit 19 functions as an input for contaminated fluid and the other conduit 19 functions as an outlet for filtered fluid or fluid by-passing the filter assembly 11. Conventional connections 21 are utilized for providing leakproof joints between respective conduits 19 and standard lines 23 utilized for conveying fluid. The connections 21 illustrated in FIG. 1 are of the type wherein an elastomeric gasket fitted around a line 23 is compressed between a flanged portion of the conduit 19 and a cylindrical connection 21 so as to give a tight sealing fit. Other conventional connections may be conveniently used such as threading the interior walls of the conduits 19 for respectively receiving the threaded ends of inlet and outlet lines 23.

The generally cylindrically shaped opening 17 is formed by an inside surface 25 of the valve body 15. The inside surface 25 is radially spaced from an axis which is substantially perpendicular to the conduits 19. The opening 17 includes a lower conical or cylindrical portion 27 thereof which has the small end adjacent an upper cylindrical portion 29. The upper cylindrical portion 29 presents a smaller opening than the opening at the small end of the conical or cylindrical portion 27. Intermediate the portion 27 and the portion 29 a flange 31 forms a coaxial opening of reduced radius. A pair of seating rings 33 coaxial with the axis extend exterior to the valve body to form bearing surfaces.

A gate or plug 35 is rotatably mounted within the opening 17 for controlling the flow of fluid. The gate 35 includes an outer radially spaced wall 37 which is conically shaped and an inner cylindrical wall 39 coaxial therewith. The inner cylindrical wall 39 projects through the opening 17 and is in gripping engagement with a handle 41. The handle 41 includes concentric thrust collars 43 which respectively engage the rings 33 of the valve body 15. The innermost of the thrust collars 43, the inner wall 39 and the flange 31 form a cavity which houses an O-ring that assures a tight seal. The gate 35 is rotatably held between the handle 41 and the valve body 15.

The valve 13 is adapted to be directly attached to a filter chamber or assembly 11. As illustrated in FIG. 1, a hinged band 47 of a U-shaped cross section securely attaches a peripheral flange on the head to a peripheral flange on the filter assembly 11. It is contemplated that any conventional type of filter chamber 11 and attachment to the valve 13 may be used with the present invention. The filter cartridge within the tank includes an axial chamber 49 and an annular chamber 51 disposed on either side of the filter media 52. Generally, the contaminated fluid flows from the annular chamber 51 through the filter media 52 into the axial chamber 49.

The inner cylindrical wall 39 forms an inner chamber 50 within the gate 35 which is adapted to communicate with the axial chamber 49 of an annular filter cartridge. As illustrated in the drawings the registry between the inner cylindrical wall 39 and the axial chamber 49 of the filter cartridge is a frictional registration of the inner wall 39 with an open neck of the end plate 53 of the cartridge. The outer chamber 55 between the inner wall 39 and the outer wall 37 communicates with the annular chamber 51 of the filter cartridge.

The outer wall 37 and the inner wall 39 are joined by an upper transverse section 57 which is substantially normal to the axis of rotation of the gate 35. A lower transverse section 59 is spaced from the upper section 57 and joins the inner wall 39 to the outer wall 37. Between the sections 57 and 59, spaced within and substantially perpendicular to the axis of rotation, a by-pass passage 61 in the form of an inserted tube communicates between openings 63 on either side of the outer wall 37. The by-pass passage 61 passes through openings on either side of the inner wall 39 and is in sealing relationship thereto. The openings 63 in the outer wall 37 are opposed so as to communicate with the laterally extending conduits 21 when the gate 35 is in a by-pass position.

A channel 64 formed between the upper 57 and lower 59 sections communicates between the inner chamber 50 and an opening 65 in the outer wall 37. The channel 64 is of sufficient size so that fluid can flow through the inner chamber 50 around the by-pass passage 61 which is positioned therein and on through the chamber 50.

The outer chamber 55 is formed between the upper section 57 and the by-pass passage so as to communicate between another opening 67 in the outer wall 37 and the annular space 51 around the filter cartridge. The respective openings 65 and 67 for the channel 64 and outer chamber 55 are in opposite sides of the outer wall 37 so as to communicate with the laterally extending conduits 19 when the gate 35 is in a filter position.

The top portion of the inner wall 39 is closed and has a pressure release valve 69 positioned therein. The top portion of the inner chamber 50 acts as a surge chamber for absorbing a back pressure or surge pressure created by an abrupt change in the flow or stoppage in flow. The surge chamber aids in preventing damage to the filter assembly and cartridge which might otherwise occur.

To maintain a sealing relationship between the outer wall 37 and the conduits 19, a groove 71 within the inside wall around each of the conduits 19 is provided. An elastomeric ring 73 is fitted into the groove 71 and compressed between the outer wall 37 and the valve body 15 for providing a fluid-tight seal.

Figure 2:
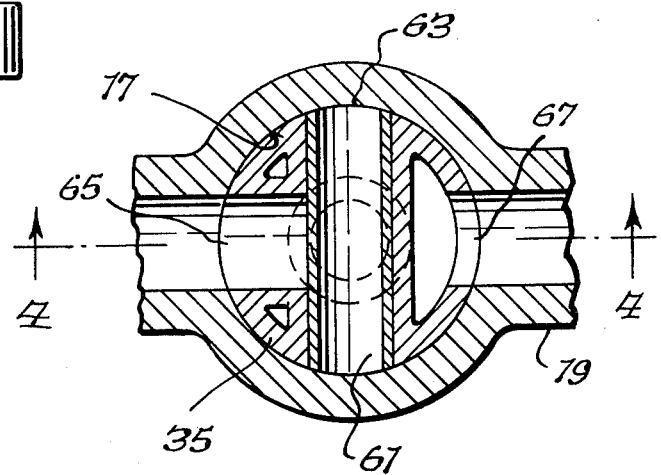
FIG. 2 is a partial section along line 2—2 of FIG. 1.
Figure 3:
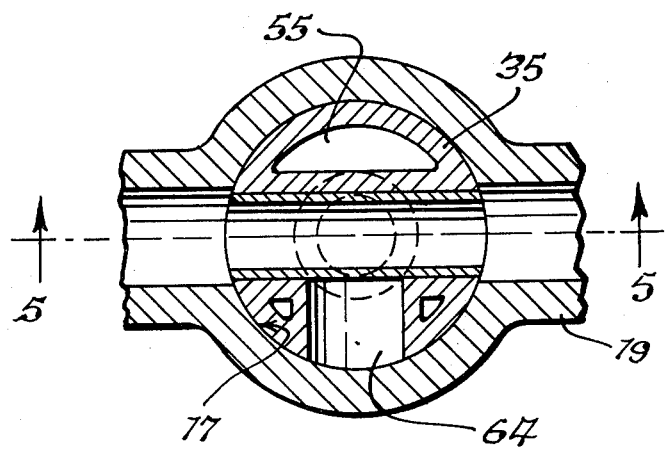
FIG. 3 is a partial section along line 2—2 of FIG. 1 showing the valve in a by-pass position.

It may be seen that the gate may be adjusted to three different positions. With the gate adjusted as illustrated in FIGS. 3 and 5 so that the by-pass passage 61 is communicating between the laterally extending conduits 19, a fluid course is provided for by-passing the filter assembly 11. With the gate adjusted to a position as illustrated in FIGS. 2 and 4 wherein the inner chamber 50 communicates with a conduit 19 and the outer chamber 55 communicates with the other conduit 19, a filtration course is defined through the filtering assembly 11. With the gate 35 turned to an intermediate position, the outer wall 37 presents a solid surface to the conduits 19 so as to block the flow of fluid. In this latter position, valve 13 is completely closed.

The construction provides a valve 13 that may be adjusted to select any one of the three positions. It is easy to operate, free from leaks and durable. The valve is relatively inexpensive to construct, install and maintain.

While preferred embodiments of this invention have been described and illustrated, it is to be recognized that modifications and variations thereof may be made without departing from the spirit and scope of this invention as described in the appended claims.

What is claimed is:

1. A valve for use with a filter, said valve comprising a valve body having a generally frustoconical opening formed therein and converging toward the top thereof, a pair of conduits opening into said valve body and in fluid communication with said opening and defining an inlet port and an outlet port in said valve body, a gate having a generally frusto-conical outer wall converging toward the top thereof and being disposed in said opening and interfitting with said valve body for rotation therein, said gate including a generally tubular inner wall disposed centrally of said gate and coaxial with the axis about which said gate rotates within said valve body, an inlet channel alignable with said inlet port and adapted to be in fluid communication with said filter, and an outlet channel in said inner wall intermediate the ends thereof and alignable with said outlet port, said inner wall having its lower end open and adapted to be in fluid communication with said filter and its upper end closed by a top portion forming in said inner wall an elongated surge chamber between said outlet channel and top portion and in fluid communication with said outlet channel, and said valve body including seal receiving grooves formed around said inlet port and outlet port and having seals therein disposed in sealing relationship with said outer wall of said gate.

2. The valve of claim 1 in combination with said filter which includes a depending tank mounted on said valve body, and annular filter media disposed within said bowl to form therebetween an outer annular chamber in fluid communication with said inlet channel and within said filter media an inner axial chamber in fluid communication with said lower end of said inner wall.

* * * * *

UNITED STATES PATENT OFFICE
CERTIFICATE OF CORRECTION

PATENT NO. : 3,907,688
DATED : September 23, 1975
INVENTOR(S) : Sam Close

It is certified that error appears in the above-identified patent and that said Letters Patent are hereby corrected as shown below:

On the page containing the Abstract, in the line containing item "[73] Assignee:" change "The Carborundum Company, Niagara Falls, N. Y." to --Purdue Research Foundation, Lafayette, Indiana.--.

Signed and Sealed this ninth Day of March 1976

[SEAL]

Attest:

RUTH C. MASON
Attesting Officer

C. MARSHALL DANN
Commissioner of Patents and Trademarks